(12) United States Patent
Velusamy et al.

(10) Patent No.: US 9,560,654 B1
(45) Date of Patent: *Jan. 31, 2017

(54) INDICATION OF MODE TRANSITIONS OF A WIRELESS COMMUNICATION DEVICE

(71) Applicant: Sprint Communications Company L.P., Overland Park, KS (US)

(72) Inventors: Saravana Velusamy, Olathe, KS (US); Suryanarayanan Ramamurthy, Olathe, KS (US); Manoj Monga, Olathe, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 334 days.

This patent is subject to a terminal disclaimer.

(21) Appl. No.: 14/308,975

(22) Filed: Jun. 19, 2014

(51) Int. Cl.
*H04W 60/00* (2009.01)
*H04W 72/04* (2009.01)

(52) U.S. Cl.
CPC .................... *H04W 72/048* (2013.01)

(58) Field of Classification Search
CPC ... H04W 24/08; H04W 76/046; H04W 60/005
USPC ......................................................... 370/328
See application file for complete search history.

(56) References Cited

U.S. PATENT DOCUMENTS

| | | | |
|---|---|---|---|
| 7,305,442 B1 | 12/2007 | Lundy | |
| 8,352,759 B2 | 1/2013 | Thomson et al. | |
| 8,880,070 B1 * | 11/2014 | Jintaseranee | H04W 24/08 455/433 |
| 2011/0075675 A1 * | 3/2011 | Koodli | H04L 12/14 370/401 |
| 2012/0033602 A1 | 2/2012 | Guo et al. | |
| 2014/0092733 A1 * | 4/2014 | Johansson | H04W 52/0216 370/230 |

OTHER PUBLICATIONS

Pierdomenico Fiadino, et al.; "Steps Towards the Extraction of Vechicular Mobility Patterns from 3G Signaling Data;" TMA; Mar. 12, 2012; pp. 1-22; FTW.
U.S. Appl. No. 13/671,107, filed Nov. 7, 2012.

* cited by examiner

*Primary Examiner* — Andrew Lai
*Assistant Examiner* — Albert Shih

(57) ABSTRACT

A Long Term Evolution (LTE) Serving Gateway (S-GW) to indicate mode transitions of a wireless communication device comprises a communication transceiver and a processing system. The communication transceiver is configured to establish a default bearer between the LTE S-GW and an LTE Packet Data Network Gateway (P-GW) for the wireless communication device, establish a bearer channel between an LTE access node and the LTE S-GW, and exchange data over the bearer channel responsive to the wireless communication device entering an active mode. The processing system is configured to release the bearer channel between the LTE access node and the LTE S-GW responsive to the wireless communication device entering an idle mode, generate mode transition records indicating idle-to-active mode transitions and indicating active-to-idle mode transitions of the wireless communication device, and direct the communication transceiver to transfer the mode transition records.

16 Claims, 5 Drawing Sheets

INDICATION OF MODE TRANSITIONS OF A WIRELESS COMMUNICATION DEVICE

TECHNICAL BACKGROUND

To establish a communication session with a wireless access network, a user operates a wireless communication device to communicate in a wireless protocol with a wireless access node. Once the communication session is established, the wireless communication device enters into an active mode in order to send and receive information during a data session. In particular, the wireless communication device operating in active mode exchanges user communications with other systems and communication networks in order to provide a communication service, such as voice communications, streaming media, or some other data session over the Internet.

To conserve battery power, a wireless communication device may enter into an idle mode when not actively receiving application data. In idle mode, the wireless communication device does not remain registered with the serving base station and releases all network resources. By deregistering from the base station, idle mode removes the wireless communication device's active requirement to perform handover procedures between base stations. The wireless communication device becomes periodically available to receive downlink broadcast traffic messages without registration at a specific base station. If the idle wireless device detects pending traffic at the network, the device must again register with a base station to receive such data. This re-registration process can add significant delay and signaling overhead to reconnect the wireless device to the network prior to receiving the pending traffic.

Overview

A method of operating a Long Term Evolution (LTE) Serving Gateway (S-GW) to indicate mode transitions of a wireless communication device is disclosed. The method comprises establishing a default bearer between the LTE S-GW and an LTE Packet Data Network Gateway (P-GW) for the wireless communication device. The method further comprises establishing a bearer channel between an LTE access node and the LTE S-GW and exchanging data over the bearer channel responsive to the wireless communication device entering an active mode. The method further comprises releasing the bearer channel between the LTE access node and the LTE S-GW responsive to the wireless communication device entering an idle mode. The method further comprises generating mode transition records indicating idle-to-active mode transitions and indicating active-to-idle mode transitions of the wireless communication device. The method further comprises transferring the mode transition records.

A Long Term Evolution (LTE) Serving Gateway (S-GW) to indicate mode transitions of a wireless communication device comprises a communication transceiver and a processing system. The communication transceiver is configured to establish a default bearer between the LTE S-GW and an LTE Packet Data Network Gateway (P-GW) for the wireless communication device, establish a bearer channel between an LTE access node and the LTE S-GW, and exchange data over the bearer channel responsive to the wireless communication device entering an active mode. The processing system is configured to release the bearer channel between the LTE access node and the LTE S-GW responsive to the wireless communication device entering an idle mode, generate mode transition records indicating idle-to-active mode transitions and indicating active-to-idle mode transitions of the wireless communication device, and direct the communication transceiver to transfer the mode transition records.

A computer apparatus to operate a Long Term Evolution (LTE) Serving Gateway (S-GW) to indicate mode transitions of a wireless communication device comprises software instructions and at least one non-transitory computer-readable storage medium storing the software instructions. The software instructions are configured, when executed by the LTE S-GW, to direct the LTE S-GW to establish a default bearer between the LTE S-GW and an LTE Packet Data Network Gateway (P-GW) for the wireless communication device, establish a bearer channel between an LTE access node and the LTE S-GW and exchange data over the bearer channel responsive to the wireless communication device entering an active mode. The software instructions are further configured to direct the LTE S-GW to release the bearer channel between the LTE access node and the LTE S-GW responsive to the wireless communication device entering an idle mode. The software instructions are further configured to direct the LTE S-GW to generate mode transition records indicating idle-to-active mode transitions and indicating active-to-idle mode transitions of the wireless communication device, and transfer the mode transition records.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
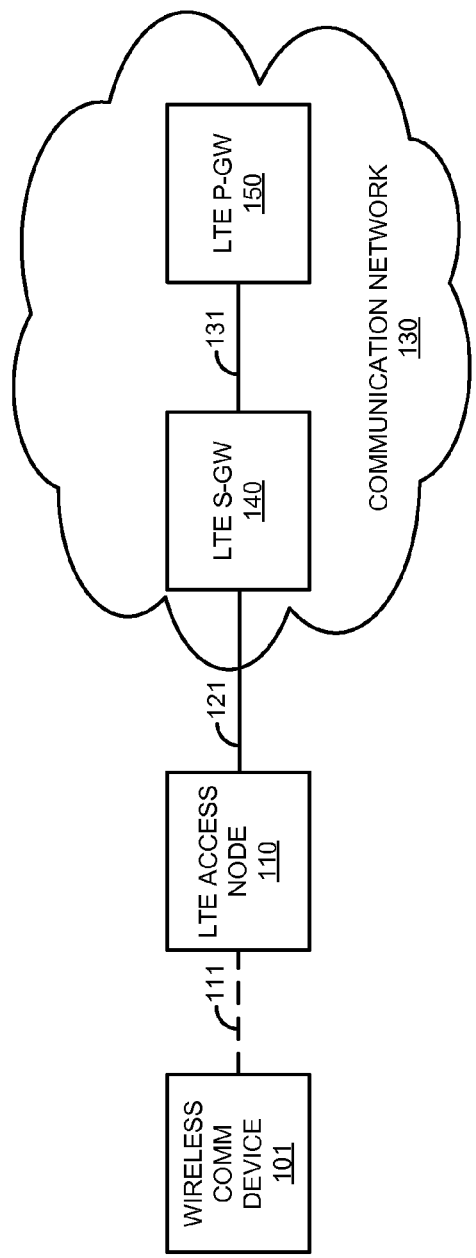
FIG. 1 is a block diagram that illustrates a communication system.

FIG. 1 is a block diagram that illustrates communication system 100. Communication system 100 includes wireless communication device 101, wireless access node 110, and communication network 130. Communication network 130 includes Long Term Evolution (LTE) serving gateway (S-GW) 140 and LTE Packet Data Network Gateway (P-GW) 150. Wireless communication device 101 and wireless access node 110 are in communication over wireless communication link 111. Wireless access node 110 and LTE S-GW 140 communicate over communication link 121. LTE S-GW 140 and LTE P-GW 150 are in communication over communication link 131.

Figure 2:
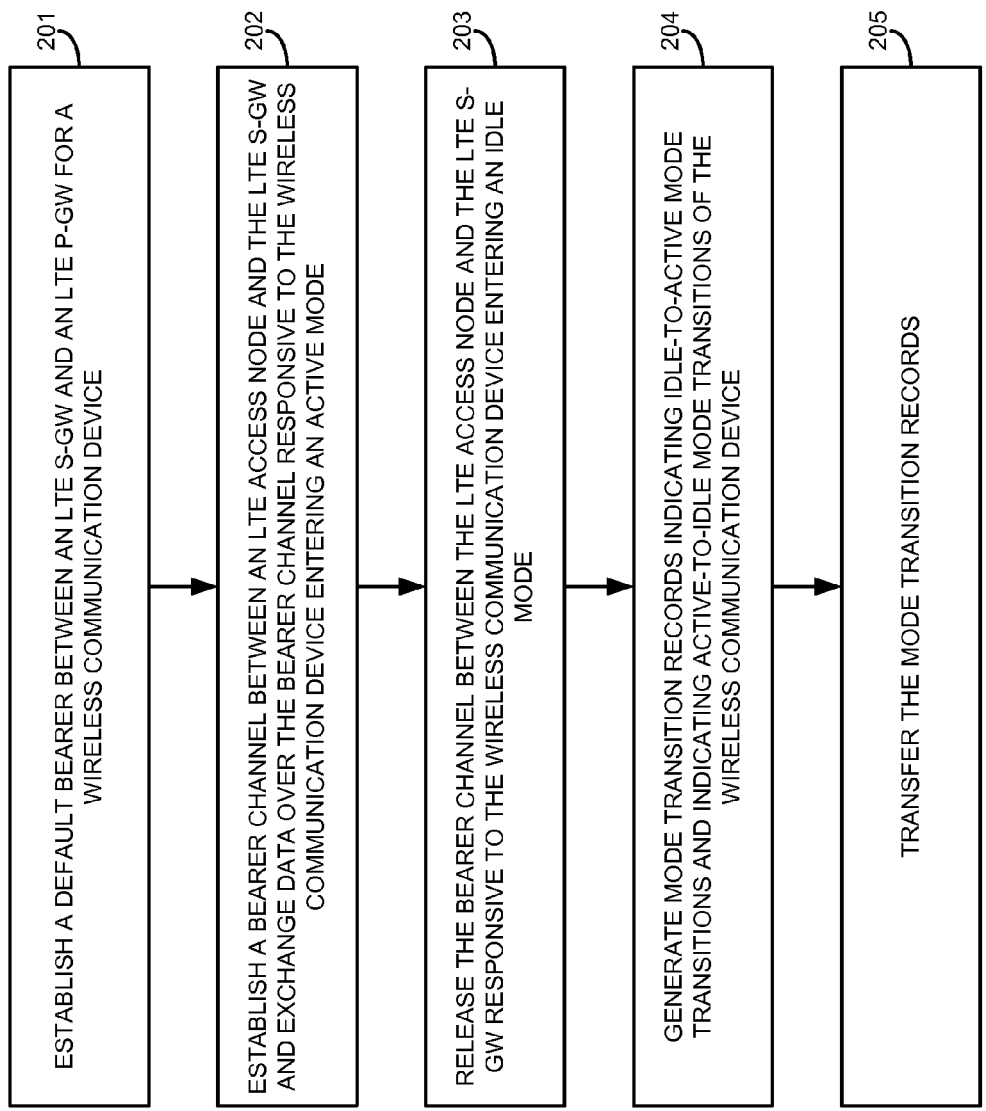
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by LTE S-GW 140 to indicate mode transitions of wireless communication device 101.

As shown in the operational flow of FIG. 2, LTE S-GW 140 establishes a default bearer between LTE S-GW 140 and LTE P-GW 150 for wireless communication device 101 (201). Typically, the default bearer is established between LTE S-GW 140 and LTE P-GW 150 during an attach procedure for wireless communication device 101. The default bearer may be used to transfer information, commonly in the form of data packets, between LTE S-GW 140 and LTE P-GW 150 for wireless communication device 101. The default bearer between S-GW 140 and P-GW 150 typically stays connected and persists even when wireless communication device 101 transitions to idle mode. In some examples, the default bearer between LTE S-GW 140 and LTE P-GW 150 comprises an S5 and/or an S8 interface between S-GW 140 and P-GW 150. An LTE S5/S8 interface typically provides user plane tunneling and tunnel management between S-GW 140 and P-GW 150, among other functionality.

LTE S-GW 140 establishes a bearer channel between LTE access node 110 and LTE S-GW 140 and exchanges data over the bearer channel responsive to wireless communication device 101 entering an active mode (202). Typically, a user of wireless communication device 101 and/or an application executing on device 101 will issue a data request which may cause device 101 to transition to active mode and S-GW 140 to responsively establish the bearer channel between LTE access node 110 and LTE S-GW 140. In active mode, wireless communication device 101 is commonly assigned network resources and necessary connection identifiers and engages in active communication with S-GW 140 and other resources of communication network 130 in order to continuously perform uplink and downlink activity. The data exchanged over the bearer channel between LTE access node 110 and LTE S-GW 140 is typically transmitted pursuant to a data session for wireless communication device 101 while operating in active mode.

LTE S-GW 140 releases the bearer channel between LTE access node 110 and LTE S-GW 140 responsive to wireless communication device 101 entering an idle mode (203). Wireless communication device 101 may transition to the idle mode whenever a data session is terminated, after some period of inactivity, or for any other reason. In idle mode, wireless communication device 101 typically deregisters with communication network 130 and releases reserved network resources. In particular, the bearer channel between LTE access node 110 and LTE S-GW 140 is released when wireless communication device 101 enters an idle mode, unlike the default bearer between LTE S-GW 140 and LTE P-GW 150, which persists even when wireless communication device 101 goes idle.

LTE S-GW 140 generates mode transition records indicating idle-to-active mode transitions and indicating active-to-idle mode transitions of wireless communication device 101 (204). Typically, LTE S-GW 140 monitors and tracks wireless communication device 101 whenever device 101 transitions from idle mode to active mode or from active mode to idle mode. LTE S-GW 140 records these connection requests made by wireless communication device 101 to generate the mode transition records indicating the idle-to-active mode and active-to-idle mode transitions.

LTE S-GW 140 then transfers the mode transition records (205). The mode transition records typically comprise a number of idle-to-active mode transitions and active-to-idle mode transitions of wireless communication device 101. Typically, LTE S-GW 140 transfers the mode transition records for delivery to LTE P-GW 150, although S-GW 140 could transfer the mode transition records to other network elements in some examples. Because the default bearer between S-GW 140 and P-GW 150 remains connected even when wireless communication device 101 transitions to idle mode, P-GW 150 is unaware of when device 101 transitions between modes. Thus, in examples where S-GW 140 transfers the mode transition records for delivery to P-GW 150, the number of connection requests that S-GW 140 has seen for wireless communication device 101 may be communicated to P-GW 150.

In some examples, LTE P-GW 150 may be configured to receive the mode transition records from S-GW 140 and transfer the mode transition records for delivery to an accounting data processing system (not shown). An accounting data processing system could comprise, in some examples, an online charging system (OCS), policy and charging rules function (PCRF), or some other type of billing system. P-GW 150 typically generates interim billing records, commonly in the form of an accounting request (ACR) message. With knowledge of the number of connection requests made by wireless communication device 101 based on the mode transition records received from S-GW 140, P-GW 150 can populate a Diameter ACR interim billing message to include the number of connection requests before sending this message to a billing platform, such as an accounting data processing system, online charging system (OCS), or any other billing system.

In some examples, after receiving the mode transition records from P-GW 150, the accounting data processing system may be configured to process the mode transition records to determine a number of mode transitions associated with wireless communication device 101 over a time period and compare the number of mode transitions over the time period to a threshold value. Then, if the number of mode transitions over the time period exceeds the threshold value, the accounting data processing system may request from LTE P-GW 150 uniform resource identifiers (URIs) accessed by wireless communication device 101 during the time period. The accounting data processing system could then correlate the URIs to individual ones of the mode transitions over the time period to identify one of the URIs associated with a greatest number of the mode transitions.

Similarly, the accounting data processing system may be configured to process the mode transition records to determine a number of mode transitions over an amount of bandwidth usage associated with wireless communication device 101, and compare the number of mode transitions over the amount of bandwidth usage to a threshold value. In this case, if the number of mode transitions over the amount of bandwidth usage exceeds the threshold value, the accounting data processing system may request URIs from LTE P-GW 150 that were accessed by wireless communication device 101 during a time period when the amount of bandwidth usage was consumed. The accounting data processing system could then correlate the URIs to individual ones of the mode transitions during the time period when the amount of bandwidth usage was consumed to identify one of the URIs associated with a greatest number of the mode transitions.

Advantageously, LTE S-GW 140 generates mode transition records for wireless communication device 101 indicating idle-to-active and active-to-idle mode transitions of device 101. By tracking these connection requests, other network elements that are unable to monitor mode transitions, such as LTE P-GW 150 and/or an accounting data processing system, may be made aware of this information. Since connection requests have a large impact on the signaling load seen by the LTE access node 110 and other Evolved Packet Core (EPC) elements, it is beneficial to convey this information to P-GW 150 so that it may be included in billing records. In this manner, a particular URI, application, device type, or the like that is associated with an excessive number of mode transitions may be determined, thereby allowing for appropriate action to be taken to reduce the amount of signaling.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, tablet, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

LTE access node 110 comprises RF communication circuitry and an antenna. The RF communication circuitry typically includes an amplifier, filter, RF modulator, and signal processing circuitry. LTE access node 110 may also comprise a router, server, memory device, software, processing circuitry, cabling, power supply, network communication interface, structural support, or some other communication apparatus. LTE access node 110 could comprise a base station, Internet access node, telephony service node, wireless data access point, or some other wireless communication system—including combinations thereof. Some examples of LTE access node 110 include a base transceiver station (BTS), base station controller (BSC), radio base station (RBS), Node B, enhanced Node B (eNodeB), and others—including combinations thereof. Wireless network protocols that may be utilized by LTE access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

LTE S-GW 140 comprises a processing system and communication transceiver. LTE S-GW 140 may also include other components such as a router, server, data storage system, and power supply. LTE S-GW 140 may reside in a single device or may be distributed across multiple devices. LTE S-GW 140 may be a discrete system or may be integrated within other systems—including other systems within communication system 100. In some examples, LTE S-GW 140 could comprise a computing system, home agent, packet data serving node (PDSN), network switch, mobile switching center, router, switching system, serving general packet radio service (GPRS) support node (SGSN), access service network (ASN) gateway, serving gateway, packet gateway, network gateway system, Internet access node, application server, service node, firewall, or some other communication system—including combinations thereof.

LTE P-GW 150 comprises a processing system and communication transceiver. LTE P-GW 150 may also include other components such as a router, server, data storage system, and power supply. LTE P-GW 150 may reside in a single device or may be distributed across multiple devices. LTE P-GW 150 may be a discrete system or may be integrated within other systems—including other systems within communication system 100. In some examples, LTE P-GW 150 could comprise a computing system, home agent, packet data serving node (PDSN), network switch, mobile switching center, router, switching system, serving general packet radio service (GPRS) support node (SGSN), access service network (ASN) gateway, serving gateway, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 may use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
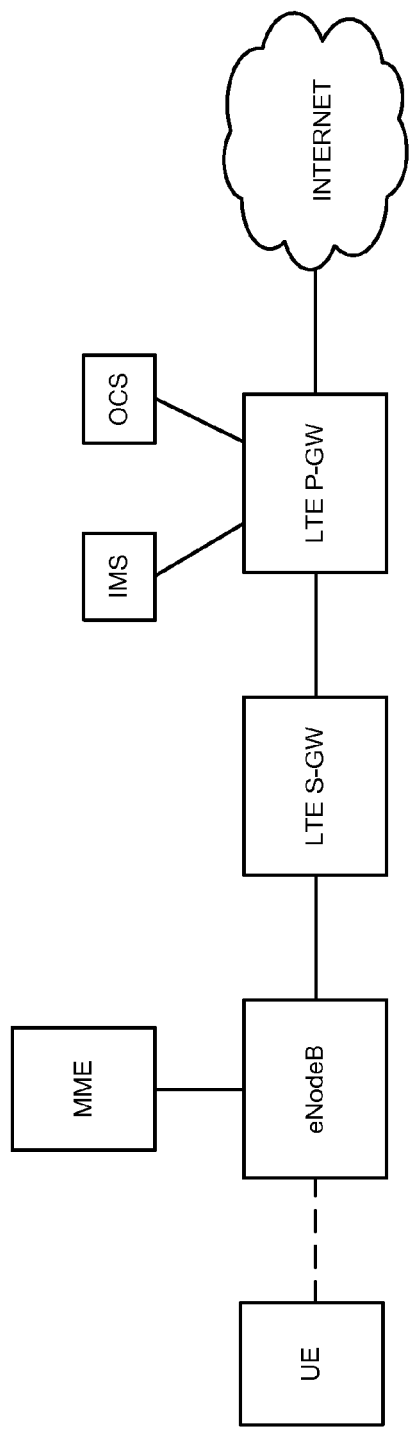
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes an enhanced Node B (eNodeB) base station that is in communication with network elements of the LTE communication network. The eNodeB base station provides an example of LTE access node 110, although node 110 may use alternative configurations. The LTE communication network in this example includes a mobility management entity (MME), serving gateway (S-GW), packet data network gateway (P-GW), and other network elements typically found in a 4G LTE communication network, such as an IP multimedia subsystem (IMS), online charging system (OCS), and the like. LTE communication system 300 also includes a user equipment (UE) device. The UE provides an example of wireless communication device 101, although device 101 could use alternative configurations. In this example, the UE is shown as being served by the eNodeB, which has a wireless coverage area that is typically defined by the signal propagation characteristics and coverage capabilities of the eNodeB.

In operation, a user operates the UE to engage in an internet data session via the LTE access network. During the data session, the UE may transition from idle mode to active mode and from active mode to idle mode a number of times. The S-GW is able to monitor these connection requests from the UE, but the P-GW is unaware of when the UE transitions between modes. However, there are some cases where it would be advantageous for the P-GW to receive this information about the mode transitions of the UE. A detailed description of how the S-GW could track the mode transitions of the UE and communicate this information to the P-GW will now be discussed with respect to FIG. 4.

Figure 4:
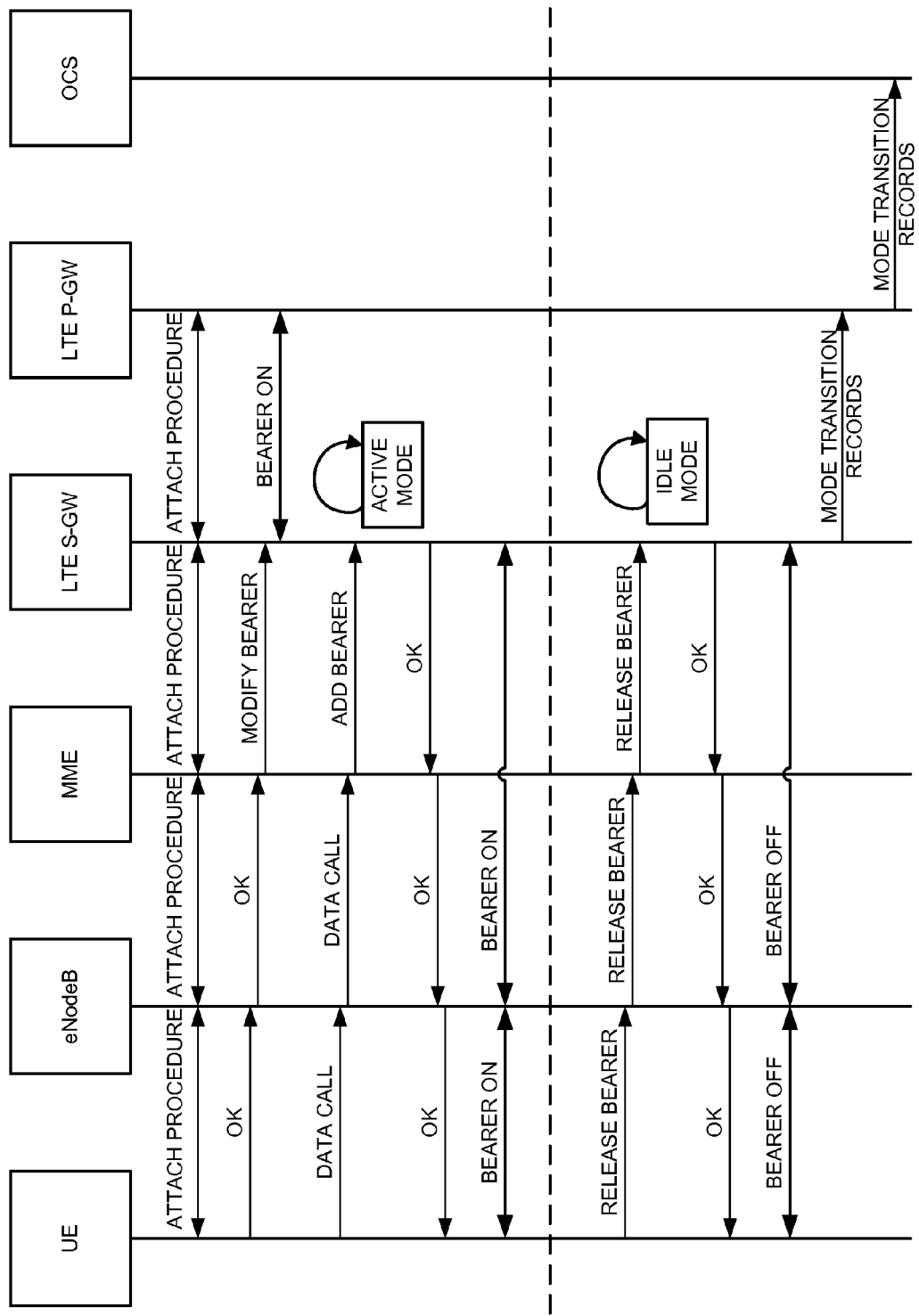
FIG. 4 is a sequence diagram that illustrates an operation of the communication system in an exemplary embodiment.

FIG. 4 is a sequence diagram that illustrates an operation of communication system 300 in an exemplary embodiment. After being powered on or moving within range of the eNodeB, the UE initiates an attach procedure in order to register with the LTE network. The attach procedure typically involves the UE utilizing a random access channel (RACH) in order to initially synchronize the UE with the eNodeB, followed by authentication, authorization, and charging functions. Once the attach procedure is underway, the MME transfers a modify bearer command to the S-GW, which in turn establishes the bearer channel between the S-GW and the P-GW. The bearer channel between the S-GW and the P-GW stays turned on and persists regardless of whether or not the UE transitions to an idle mode or an active mode.

Once the bearer between the S-GW and the P-GW is established, the UE initiates a data call. For example, an application executing on the UE, such as a weather application, may initiate a data session to receive updates from an application server. Responsive to the data call, the MME transfers an add bearer command to the S-GW. The UE transitions to an active state and the S-GW provides an OK message to the MME which in turn transfers an OK message to the eNodeB which provides an OK message to the UE. A bearer channel is then established as a tunnel between the UE and the S-GW in order to provide the data session to the UE.

At some point later in time, as shown by the dashed line appearing in FIG. 4, the bearer channel between the UE and the S-GW is released. This may occur, for example, when the S-GW detects that the UE has released the bearer, when the S-GW receives a request to release the bearer, or for any other reason. The release bearer command is forwarded by the eNodeB to the MME and from the MME to the S-GW. The UE transitions into idle mode and the S-GW provides an OK message to the MME which in turn transfers an OK message to the eNodeB which provides an OK message to the UE. The bearer channel between the UE and the S-GW is then released because the UE has transitioned to idle mode. However, the P-GW has no knowledge of this transition, and thus the S-GW transfers mode transition records to the P-GW. The mode transition records indicate a number of transitions made by the UE from idle to active mode and from active to idle mode. The P-GW may then forward the mode transition records on to the OCS.

In some examples, instead of the S-GW automatically sending the reporting message to the P-GW that includes the number of connection requests, the P-GW could query the S-GW for the number of connection request seen for the UE prior to the P-GW generating an interim billing record for the UE. Once the P-GW receives the reporting message from the S-GW, typically in the form of an accounting request (ACR) message, the P-GW can populate a new parameter that contains the number of connection requests in the Diameter ACR interim message, which is then sent to the OCS billing platform. By tracking the number of connection requests and forwarding this information on to the P-GW, analytics can be performed on the interim billing records generated by the P-GW so that a particular URI, application, device type, or any other metric may be correlated to the number of connection requests. In this manner, appropriate action may be taken to reduce the amount of signaling attributable to the excessive connection requests originated by the UE.

Figure 5:
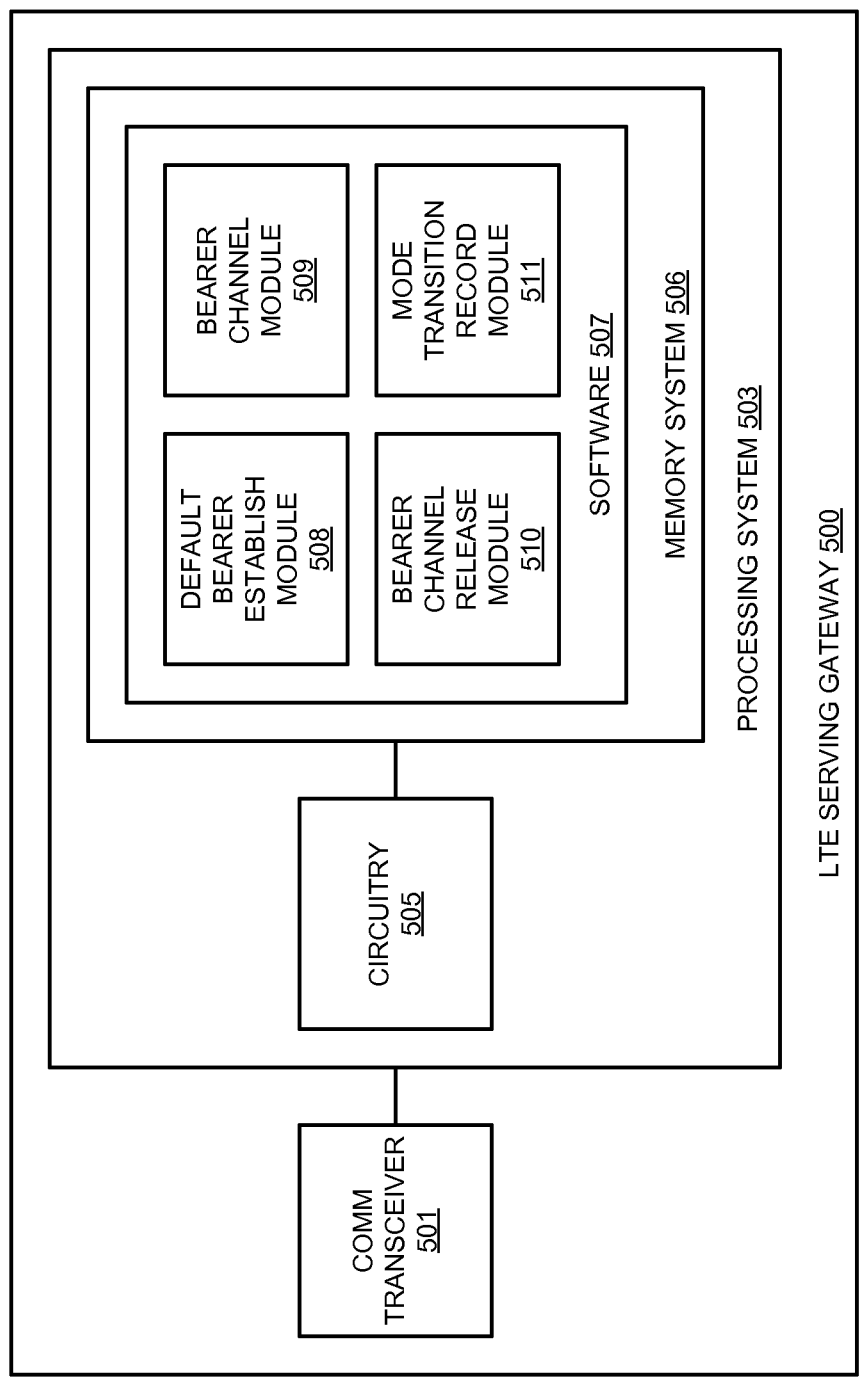
FIG. 5 is a block diagram that illustrates a Long Term Evolution serving gateway.

FIG. 5 is a block diagram that illustrates LTE serving gateway 500. LTE serving gateway 500 provides an example of LTE serving gateway 140, although S-GW 140 may use alternative configurations. LTE serving gateway 500 comprises communication transceiver 501 and processing system 503. Processing system 503 is linked to communication transceiver 501. Processing system 503 includes processing circuitry 505 and memory device 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof. Communication transceiver 501 could be configured to establish a default bearer between LTE serving gateway 500 and an LTE Packet Data Network Gateway (P-GW) for a wireless communication device. Communication transceiver 501 could also be configured to establish a bearer channel between an LTE access node and LTE serving gateway 500, and to exchange data over the bearer channel responsive to the wireless communication device entering an active mode.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for LTE serving gateway 140. In particular, operating software 507 may direct processing system 503 to direct communication transceiver 501 to establish a default bearer between LTE serving gateway 500 and an LTE Packet Data Network Gateway (P-GW) for a wireless communication device. Operating software 507 may further direct processing system 503 to direct communication transceiver 501 to establish a bearer channel between an LTE access node and LTE serving gateway 500, and to exchange data over the bearer channel responsive to the wireless communication device entering an active mode. In addition, operating software 507 directs processing system 503 to release the bearer channel between the LTE access node and LTE serving gateway 500 responsive to the wireless communication device entering an idle mode. Further, operating software 507 directs processing system 503 to generate mode transition records indicating idle-to-active mode transitions and indicating active-to-idle mode transitions of the wireless communication device. Operating software 507 also directs processing system 503 to direct communication transceiver 501 to transfer the mode transition records.

In some examples, operating software 507 could comprise a default bearer establishment software module 508 that establishes a default bearer between LTE serving gateway 500 and an LTE Packet Data Network Gateway (P-GW) for a wireless communication device. Additionally, operating software 507 could comprise a bearer channel software module 509 that establishes a bearer channel between an LTE access node and LTE serving gateway 500, and exchanges data over the bearer channel responsive to the wireless communication device entering an active mode. Further, operating software 507 could comprise a bearer channel release software module 510 that releases the bearer channel between the LTE access node and LTE serving gateway 500 responsive to the wireless communication device entering an idle mode. Finally, operating software 507 could comprise a mode transition record software module 511 that generates mode transition records indicating idle-to-active mode transitions and indicating active-to-idle mode transitions of the wireless communication device, and transfers the mode transition records.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) Serving Gateway (S-GW) to indicate mode transitions of a wireless communication device, the method comprising:
    establishing a default bearer between the LTE S-GW and an LTE Packet Data Network Gateway (P-GW) for the wireless communication device;
    establishing a bearer channel between an LTE access node and the LTE S-GW and exchanging data over the bearer channel responsive to the wireless communication device entering an active mode;
    releasing the bearer channel between the LTE access node and the LTE S-GW responsive to the wireless communication device entering an idle mode;
    generating mode transition records indicating idle-to-active mode transitions and indicating active-to-idle mode transitions of the wireless communication device; and
    transferring the mode transition records for delivery to an accounting data processing system, wherein the accounting data processing system is configured to process the mode transition records to determine a number of mode transitions associated with the wireless communication device over a time period and compare the number of mode transitions over the time period to a threshold value.

2. The method of claim 1 wherein the accounting data processing system is configured to, if the number of mode transitions over the time period exceeds the threshold value, request from the LTE P-GW uniform resource identifiers (URIs) accessed by the wireless communication device during the time period.

3. The method of claim 2 wherein the accounting data processing system is configured to correlate the URIs to individual ones of the mode transitions over the time period to identify one of the URIs associated with a greatest number of the mode transitions.

4. The method of claim 1 wherein the accounting data processing system is configured to process the mode transition records to determine a number of mode transitions over an amount of bandwidth usage associated with the wireless communication device and compare the number of mode transitions over the amount of bandwidth usage to a threshold value.

5. The method of claim 4 wherein the accounting data processing system is configured to, if the number of mode transitions over the amount of bandwidth usage exceeds the threshold value, request from the LTE P-GW uniform resource identifiers (URIs) accessed by the wireless communication device during a time period when the amount of bandwidth usage was consumed.

6. The method of claim 5 wherein the accounting data processing system is configured to correlate the URIs to individual ones of the mode transitions during the time period when the amount of bandwidth usage was consumed to identify one of the URIs associated with a greatest number of the mode transitions.

7. The method of claim 1 wherein the accounting data processing system comprises an online charging system (OCS).

8. The method of claim 1 wherein the default bearer between the LTE S-GW and the LTE P-GW comprises an S5 interface between the LTE S-GW and the LTE P-GW.

9. A Long Term Evolution (LTE) Serving Gateway (S-GW) to indicate mode transitions of a wireless communication device, the LTE S-GW comprising:

a communication transceiver configured to establish a default bearer between the LTE S-GW and an LTE Packet Data Network Gateway (P-GW) for the wireless communication device, establish a bearer channel between an LTE access node and the LTE S-GW, and exchange data over the bearer channel responsive to the wireless communication device entering an active mode; and a processing system configured to release the bearer channel between the LTE access node and the LTE S-GW responsive to the wireless communication device entering an idle mode, generate mode transition records indicating idle-to-active mode transitions and indicating active-to-idle mode transitions of the wireless communication device, and direct the communication transceiver to transfer the mode transition records for delivery to an accounting data processing system, wherein the accounting data processing system is configured to process the mode transition records to determine a number of mode transitions associated with the wireless communication device over a time period and compare the number of mode transitions over the time period to a threshold value.

10. The LTE S-GW of claim 9 wherein the accounting data processing system is configured to, if the number of mode transitions over the time period exceeds the threshold value, request from the LTE P-GW uniform resource identifiers (URIs) accessed by the wireless communication device during the time period.

11. The LTE S-GW of claim 10 wherein the accounting data processing system is configured to correlate the URIs to individual ones of the mode transitions over the time period to identify one of the URIs associated with a greatest number of the mode transitions.

12. The LTE S-GW of claim 9 wherein the accounting data processing system is configured to process the mode transition records to determine a number of mode transitions over an amount of bandwidth usage associated with the wireless communication device and compare the number of mode transitions over the amount of bandwidth usage to a threshold value.

13. The LTE S-GW of claim 12 wherein the accounting data processing system is configured to, if the number of mode transitions over the amount of bandwidth usage exceeds the threshold value, request from the LTE P-GW uniform resource identifiers (URIs) accessed by the wireless communication device during a time period when the amount of bandwidth usage was consumed.

14. The LTE S-GW of claim 13 wherein the accounting data processing system is configured to correlate the URIs to individual ones of the mode transitions during the time period when the amount of bandwidth usage was consumed to identify one of the URIs associated with a greatest number of the mode transitions.

15. The LTE S-GW of claim 9 wherein the accounting data processing system comprises an online charging system (OCS).

16. A computer apparatus to operate a Long Term Evolution (LTE) Serving Gateway (S-GW) to indicate mode transitions of a wireless communication device, the computer apparatus comprising:

software instructions configured, when executed by the LTE S-GW, to direct the LTE S-GW to establish a default bearer between the LTE S-GW and an LTE Packet Data Network Gateway (P-GW) for the wireless communication device, establish a bearer channel between an LTE access node and the LTE S-GW and exchange data over the bearer channel responsive to the wireless communication device entering an active mode, release the bearer channel between the LTE access node and the LTE S-GW responsive to the wireless communication device entering an idle mode, generate mode transition records indicating idle-to-active mode transitions and indicating active-to-idle mode transitions of the wireless communication device, and transfer the mode transition records for delivery to an accounting data processing system, wherein the accounting data processing system is configured to process the mode transition records to determine a number of mode transitions associated with the wireless communication device over a time period and compare the number of mode transitions over the time period to a threshold value; and at least one non-transitory computer-readable storage medium storing the software instructions.

* * * * *